United States Patent
Kagami

(10) Patent No.: US 11,907,482 B2
(45) Date of Patent: *Feb. 20, 2024

(54) PEN DETECTION SYSTEM

(71) Applicant: Wacom Co., Ltd., Saitama (JP)

(72) Inventor: Tomohiro Kagami, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,658

(22) Filed: Feb. 10, 2023

(65) Prior Publication Data

US 2023/0185409 A1 Jun. 15, 2023

Related U.S. Application Data

(63) Continuation of application No. 17/585,940, filed on Jan. 27, 2022, now Pat. No. 11,604,546, which is a
(Continued)

(30) Foreign Application Priority Data

Jun. 6, 2018 (JP) .................................. 2018-108534

(51) Int. Cl.
G06F 3/044 (2006.01)
G06F 3/0354 (2013.01)
G06F 3/047 (2006.01)

(52) U.S. Cl.
CPC ........ *G06F 3/0442* (2019.05); *G06F 3/03545* (2013.01); *G06F 3/047* (2013.01); *G06F 3/0446* (2019.05)

(58) Field of Classification Search
CPC .. G06F 3/03545; G06F 3/0442; G06F 3/0446; G06F 3/047
See application file for complete search history.

(56) References Cited

U.S. PATENT DOCUMENTS

2009/0251437 A1 10/2009 Hung et al.
2009/0284494 A1 11/2009 Hung et al.
(Continued)

FOREIGN PATENT DOCUMENTS

JP 2009-252230 A 10/2009
JP 2009-284453 A 12/2009
(Continued)

OTHER PUBLICATIONS

International Search Report, dated Aug. 13, 2019, for International Application No. PCT/JP2019/021313, 2 pages.

*Primary Examiner* — Michael Pervan
(74) *Attorney, Agent, or Firm* — Seed IP Law Group LLP

(57) ABSTRACT

A pen detection system is provided that detects a pen signal transmitted from a pen to detect a position of the pen. The system includes a sensor pattern in which an electrode group including first and second partial electrode groups is disposed; a first integrated circuit that is connected to the first partial electrode group to acquire a level distribution of the pen signal in the first partial electrode group; and a second integrated circuit that is connected to the second partial electrode group to acquire a level distribution of the pen signal in the second partial electrode group. A predetermined number of boundary electrodes positioned near a boundary of the first partial electrode group and the second partial electrode group among a plurality of electrodes included in the electrode group are connected to both of the first and second integrated circuits, wherein the predetermined number is an even number.

15 Claims, 6 Drawing Sheets

Related U.S. Application Data continuation of application No. 17/071,936, filed on Oct. 15, 2020, now Pat. No. 11,249,602, which is a continuation of application No. PCT/JP2019/021313, filed on May 29, 2019.

(56) References Cited

U.S. PATENT DOCUMENTS

| | | |
|---|---|---|
| 2011/0267304 A1 | 11/2011 | Simmons et al. |
| 2013/0278525 A1 | 10/2013 | Lim et al. |
| 2015/0035797 A1 | 2/2015 | Shahparnia |
| 2015/0062040 A1 | 3/2015 | Park et al. |
| 2015/0185914 A1 | 7/2015 | Han et al. |
| 2016/0117047 A1 | 4/2016 | Dinu et al. |

FOREIGN PATENT DOCUMENTS

| | | |
|---|---|---|
| JP | 2011-238240 A | 11/2011 |
| JP | 5984259 B2 | 9/2016 |

FIG.3

|       | $2x_1$ | $2x_2$ | $2x_3$ | $2x_4$ | $2x_5$ | REFERENCE LEVEL |
|-------|--------|--------|--------|--------|--------|-----------------|
| $2x_1$ | $r_1$ | $r_2$ |        |        |        | $r_1-r_2$ |
| $2x_2$ |        | $r_2$ | $r_3$ |        |        | $r_2-r_3$ |
| $2x_3$ |        |        | $r_3$ | $r_4$ |        | $r_3-r_4$ |
| $2x_4$ |        |        |        | $r_4$ | $r_5$ | $r_4-r_5$ |

F I G . 7
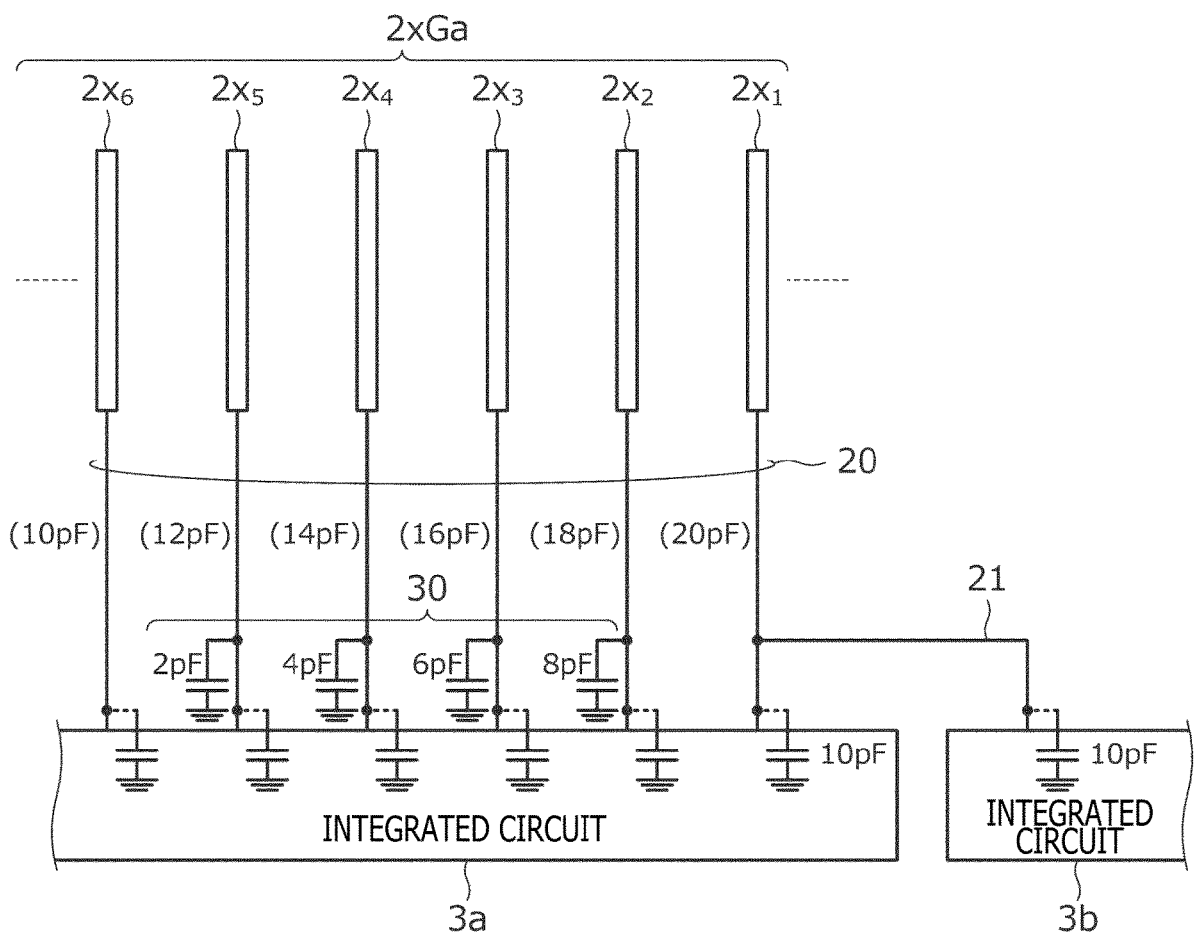

PEN DETECTION SYSTEM

BACKGROUND

Technical Field

The present invention relates to a pen detection system, and particularly, to a pen detection system mounted on a large display panel.

Description of the Related Art

There is a known pen detection system that derives two-dimensional coordinates indicating an instruction position of a stylus pen. This type of system includes an electrode group arranged on a display panel, such as a liquid crystal panel, and an integrated circuit connected to the electrode group. In such system, the electrode group includes a group of column electrodes placed side by side along a column direction and a group of row electrodes placed side by side along a row direction. The integrated circuit acquires a reception level of a signal transmitted by the stylus pen in each electrode and derives the two-dimensional coordinates based on the results.

An example of the pen detection system is disclosed in Patent Document 1.

PRIOR ART DOCUMENT

Patent Document

Patent Document 1: Japanese Patent No. 5984259

BRIEF SUMMARY

Technical Problem

The variation in the size of a display panel is increased in recent years, while the pen detection system is often mounted on a large display panel. This increases the number of electrodes included in the electrode group, and thus the number of terminals of the integrated circuit needs to be increased. However, not many pen detection systems are manufactured specifically to be mounted on large display panels, and the cost of such pen detection system increases if a dedicated integrated circuit is to be manufactured. Therefore, a need exists to address such issue.

Thus, an object of the present invention is to provide a pen detection system that does not require an integrated circuit dedicated to a large display panel.

Technical Solution

A first aspect of the present invention provides a pen detection system that detects a pen signal transmitted from a pen to detect a position of the pen, the pen detection system including a sensor pattern in which a column electrode group including first and second partial column electrode groups and a row electrode group including first and second partial row electrode groups are placed on top of each other in a two-dimensional region, a first integrated circuit that is connected to the first partial column electrode group to acquire a first column level distribution indicating a level distribution of the pen signal in the first partial column electrode group and that is connected to the first partial row electrode group to acquire a first row level distribution indicating a level distribution of the pen signal in the first partial row electrode group, and a second integrated circuit that is connected to the second partial column electrode group to acquire a second column level distribution indicating a level distribution of the pen signal in the second partial column electrode group and that is connected to the second partial row electrode group to acquire a second row level distribution indicating a level distribution of the pen signal in the second partial row electrode group. The pen detection system derives a column direction position of the pen in the two-dimensional region, based on the first and second column level distributions, and derives a row direction position of the pen in the two-dimensional region, based on the first and second row level distributions.

A second aspect of the present invention provides a pen detection system that detects a pen signal transmitted from a pen to detect a position of the pen, the pen detection system including a sensor pattern in which an electrode group including first and second partial electrode groups is disposed, a first integrated circuit that is connected to the first partial electrode group to acquire a level distribution of the pen signal in the first partial electrode group, and a second integrated circuit that is connected to the second partial electrode group to acquire a level distribution of the pen signal in the second partial electrode group. A predetermined number of boundary electrodes positioned near a boundary of the first partial electrode group and the second partial electrode group among a plurality of electrodes included in the electrode group is connected to both of the first and second integrated circuits.

Advantageous Effects

According to the first aspect of the present invention, the number of electrodes that need to be connected to one integrated circuit can be reduced compared to the case in which only one integrated circuit is provided, and thus an integrated circuit for a small panel can be used also in a large panel. Therefore, the pen detection system can be mounted on a large display panel without requiring an integrated circuit dedicated to the large display panel.

According to the second aspect of the present invention, when a position derivation method requires use a plurality of electrodes to obtain one position coordinate, such as a differential detection method for cancelling noise and a 4-point method or a 3-point method for obtaining coordinates between electrodes, a single integrated circuit can be used to derive the position even at the boundary of the first partial electrode group and the second partial electrode group. This can prevent generation of a sensitivity difference between the electrodes caused by an impedance difference between the electrodes to thereby prevent an error in the derived position.

BRIEF DESCRIPTION OF THE DRAWINGS

FIG. 3 is a diagram describing details of a derivation method of an x coordinate of a pen I1 derived by a master controller 4.

FIG. 7 is a diagram schematically illustrating a portion of column electrodes 2x of a first partial column electrode group 2xGa included in the pen detection system 1 according to a third embodiment of the present invention.

DETAILED DESCRIPTION

Hereinafter, embodiments of the present invention will be described in detail with reference to the attached drawings.

Figure 1:
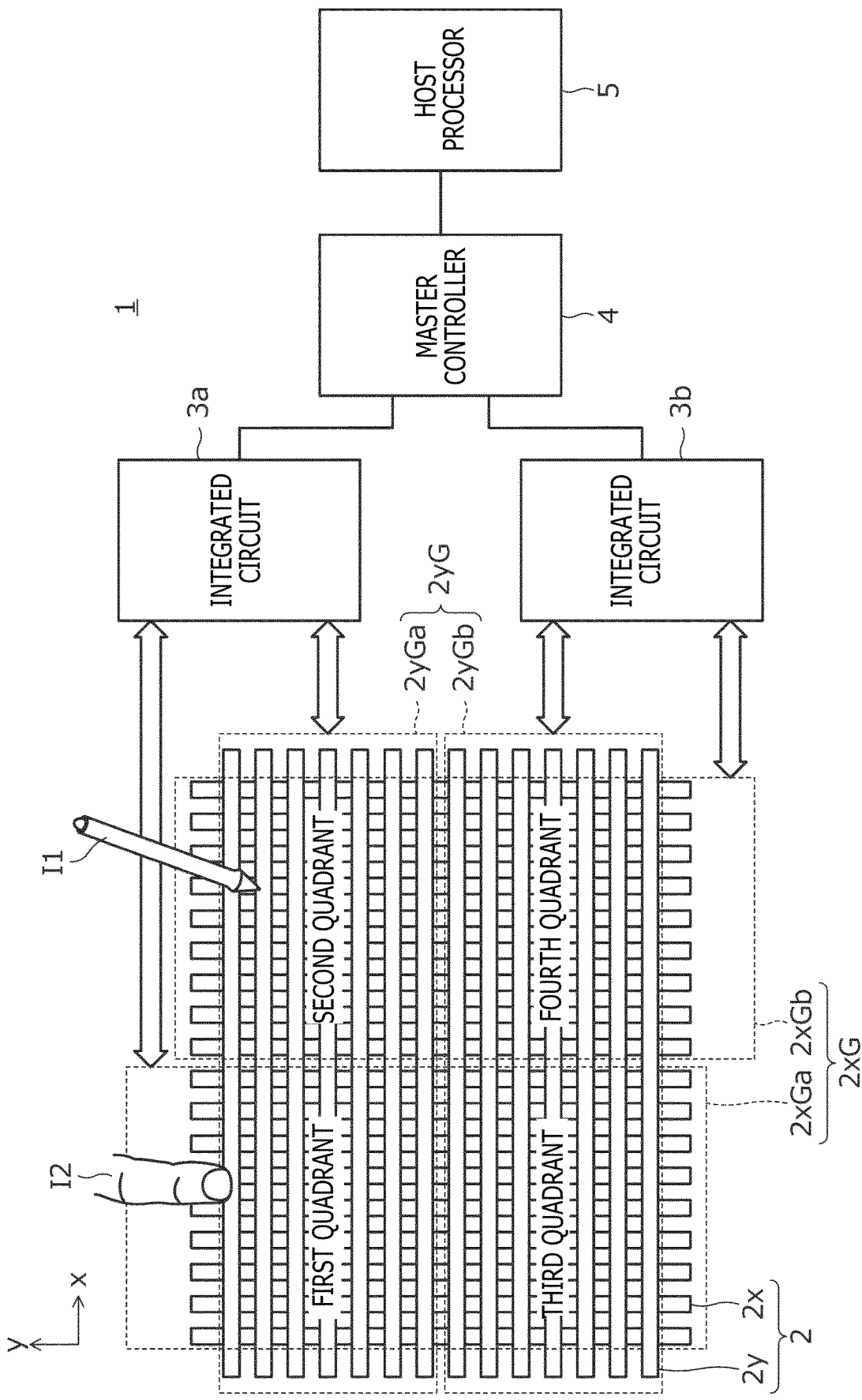
FIG. 1 is a diagram illustrating a configuration of a pen detection system 1 according to a first embodiment of the present invention.

FIG. 1 is a diagram illustrating a configuration of a pen detection system 1 according to a first embodiment of the present invention. The pen detection system 1 according to the present embodiment is a system that can detect the position of a pen I1 as a stylus pen by detecting a pen signal transmitted from the pen I1 and that can also detect the position of a finger I2. As illustrated in FIG. 1, the pen detection system 1 includes a sensor pattern 2, integrated circuits 3a and 3b, a master controller 4, and a host processor 5.

The pen detection system 1 typically is a tablet computer. In this case, the sensor pattern 2 is arranged on a display surface of a display panel not illustrated, and the host processor 5 includes a central processing unit of the tablet computer. However, the pen detection system 1 may include another type of computer. In addition, the host processor 5 may be arranged in the same housing as, or may be arranged in a separate housing from, the housing of the sensor pattern 2, the integrated circuits 3a and 3b, and the master controller 4.

The sensor pattern 2 has a structure in which a plurality of column electrodes 2x extending in an illustrated y direction and arranged at equal intervals in an x direction orthogonal to the y direction and a plurality of row electrodes 2y extending in the x direction and arranged at equal intervals in the y direction are placed on top of each other in a two-dimensional region.

The plurality of column electrodes 2x provides a column electrode group 2xG including a first partial column electrode group 2xGa and a second partial column electrode group 2xGb. The boundary of the first partial column electrode group 2xGa and the second partial column electrode group 2xGb is provided at the center in the x direction, and the number of column electrodes 2x included in the first partial column electrode group 2xGa and the number of column electrodes 2x included in the second partial column electrode group 2xGb are set to the same number. However, the number of column electrodes 2x included in the first partial column electrode group 2xGa and the number of column electrodes 2x included in the second partial column electrode group 2xGb may be different.

Similarly, the plurality of row electrodes 2y provides a row electrode group 2yG including a first partial row electrode group 2yGa and a second partial row electrode group 2yGb. The boundary of the first partial row electrode group 2yGa and the second partial row electrode group 2yGb is provided at the center in the y direction, and the number of row electrodes 2y included in the first partial row electrode group 2yGa and the number of row electrodes 2y included in the second partial row electrode group 2yGb are set to the same number. As is clear from FIG. 1, each of the first partial row electrode group 2yGa and the second partial row electrode group 2yGb overlaps with both the first partial column electrode group 2xGa and the second partial column electrode group 2xGb.

Figure 2:
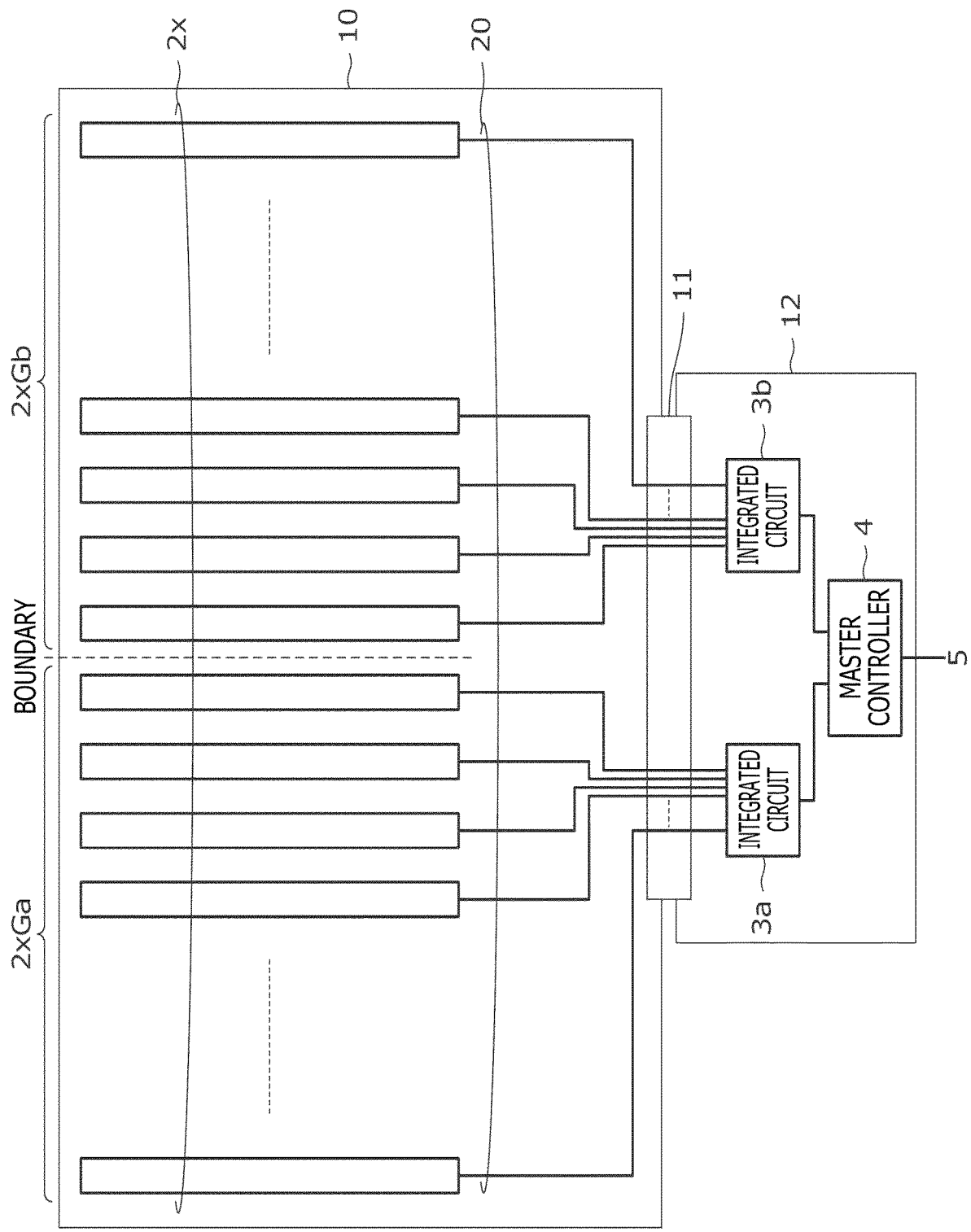
FIG. 2 is a schematic top view of the pen detection system 1 according to the first embodiment of the present invention.

FIG. 2 is a schematic top view of the pen detection system 1 according to the present embodiment. However, the row electrodes 2y are not illustrated in FIG. 2. As illustrated in FIG. 2, the sensor pattern 2 is arranged on a glass 10, and the integrated circuits 3a and 3b and the master controller 4 are arranged on a circuit board 12 different from the glass 10. The glass 10 and the circuit board 12 are connected to each other through a flexible board 11. In addition, the pen detection system 1 includes a plurality of main lines 20 connecting each of the column electrodes 2x to one of the integrated circuits 3a and 3b, wherein each of the main lines 20 is formed over and across the glass 10, the flexible board 11, and the circuit board 12. Although not illustrated, each of the row electrodes 2y is also connected to one of the integrated circuits 3a and 3b through the main line.

FIG. 1 will be described again. The integrated circuit 3a (first integrated circuit) is an integrated circuit connected to the column electrodes 2x included in the first partial column electrode group 2xGa and the row electrodes 2y included in the first partial row electrode group 2yGa. The operation timing and the activity of the integrated circuit 3a are controlled by the master controller 4.

The activity of the integrated circuit 3a will be specifically described. First, at the timing of detecting the position of the pen I1, the integrated circuit 3a executes a process of acquiring a level distribution (first column level distribution) of a pen signal in the first partial column electrode group 2xGa and acquiring a level distribution (first row level distribution) of the pen signal in the first partial row electrode group 2yGa. The acquired level distributions are supplied from the integrated circuit 3a to the master controller 4.

On the other hand, at the timing of detecting the position of the finger I2, the integrated circuit 3a executes a process of supplying a finger detection signal, which is supplied from the master controller 4, to the row electrodes 2y in the first partial row electrode group 2yGa, a process of detecting a cross point capacitance change (change in the capacitance at the intersection of the column electrode 2x and the row electrode 2y) in a region (the "first quadrant" as illustrated) where the first partial row electrode group 2yGa and the first partial column electrode group 2xGa cross, and a process of detecting a cross point capacitance change in a region (the "third quadrant" as illustrated) where the second partial row electrode group 2yGb and the first partial column electrode group 2xGa cross. The detected cross point capacitance changes are supplied from the integrated circuit 3a to the master controller 4.

The integrated circuit 3b (second integrated circuit) is an integrated circuit connected to the column electrodes 2x included in the second partial column electrode group 2xGb and the row electrodes 2y included in the second partial row electrode group 2yGb. The operation timing and the activity of the integrated circuit 3b are also controlled by the master controller 4.

The activity of the integrated circuit 3b will be specifically described. First, at the timing of detecting the position of the pen I1, the integrated circuit 3b executes a process of acquiring a level distribution (second column level distribution) of a pen signal in the second partial column electrode group 2xGb and acquiring a level distribution (second row level distribution) of the pen signal in the second partial row electrode group 2yGb. The acquired level distributions are supplied from the integrated circuit 3b to the master controller 4.

On the other hand, at the timing of detecting the position of the finger I2, the integrated circuit 3b executes a process of supplying a finger detection signal, which is supplied from the master controller 4, to the row electrodes 2y in the second partial row electrode group 2yGb, a process of detecting a cross point capacitance change in a region (the "second quadrant" as illustrated) where the first partial row electrode group 2yGa and the second partial column electrode group 2xGb cross, and a process of detecting a cross point capacitance change in a region (the "fourth quadrant" as illustrated) where the second partial row electrode group 2yGb and the second partial column electrode group 2xGb cross. The detected cross point capacitance changes are supplied from the integrated circuit 3b to the master controller 4.

The master controller 4 is connected to each of the integrated circuits 3a and 3b and has a function of controlling the operation timing and the activity of the integrated circuits 3a and 3b.

Specifically, at the timing of detecting the position of the pen I1, the master controller 4 causes the integrated circuits 3a and 3b to acquire the level distributions of the pen signal in the sensor pattern 2 and derives the position of the pen I1 based on the acquired level distributions. More specifically, the master controller 4 is configured to derive the column direction position (x coordinate) of the pen I1 based on the first and second column level distributions and derive the row direction position (y coordinate) of the pen I1 based on the first and second row level distributions.

FIG. 3 is a diagram describing details of the derivation method of the x coordinate of the pen I1 derived by the master controller 4. Although the description below focuses on the x coordinate, the description similarly applies to the y coordinate.

To derive the x coordinate of the pen I1, the master controller 4 first selects four column electrodes 2x based on the x coordinate of the pen I1 derived last time. Specifically, the master controller 4 selects four column electrodes 2x in order from the column electrode 2x closest to the x coordinate of the pen I1 derived last time. Column electrodes $2x_1$ to $2x_4$ illustrated on the vertical axis of FIG. 3 represent four column electrodes 2x selected in this way.

Next, the master controller 4 subtracts a reception level $r_2$ of the pen signal in the column electrode $2x_2$ adjacent to the column electrode $2x_1$ in a predetermined direction from a reception level $r_1$ of the pen signal in the selected column electrode $2x_1$ to obtain a reference level $r_1$-$r_2$ of the pen signal in the column electrode $2x_1$. Similarly, the master controller 4 obtains reference levels $r_2$-$r_3$, $r_3$-$r_4$, and $r_4$-$r_5$ of the pen signal in the column electrodes $2x_2$ to $2x_4$, respectively. The master controller 4 then assumes the four reference levels $r_1$-$r_2$, $r_2$-$r_3$, $r_3$-$r_4$, and $r_4$-$r_5$ obtained in this way as the reception levels in the column electrodes $2x_1$ to $2x_4$, respectively, and uses a predetermined distribution curve to make an approximation and thereby obtain the x coordinate of the apex of the obtained curve. The master controller 4 acquires the x coordinate obtained in this way as the x coordinate of the pen I1.

According to the method, the distribution of the reception levels in a plurality of column electrodes 2x, instead of one column electrode 2x, is used to obtain the x coordinate, and therefore, the x coordinate of a position between the column electrodes 2x can also be obtained. The derivation method of the coordinate is called an n-point method. Here, n represents the number of electrodes used for referencing the distribution, and n can be any number equal to or greater than two. For example, n=4 (4-point method) when the distribution of the reception levels in four electrodes is referenced as in FIG. 3, n=3 (3-point method) when the distribution of the reception levels in three electrodes is referenced, and n=6 (6-point method) when the distribution of the reception levels in six electrodes is referenced.

In addition, instead of the reception level itself of the pen signal in each column electrode 2x, reference levels calculated from the reception levels detected by one or more other column electrodes 2x are used to obtain the x coordinate, and therefore, noise (such as the noise generated in the display panel) commonly superimposed on the column electrodes 2x can be canceled. Such derivation method of the coordinate is called an m-level differential detection method. Here, m represents the number of reception levels used in the calculation, and m can be equal to or greater than two. For example, m=2 (2-level differential detection method) when the reference levels are obtained by the calculation of two reception levels as in FIG. 3, and for example, m=4 (4-level differential detection method) when the reference levels are obtained by the calculation of four reception levels. Note that the other column electrode 2x used for obtaining the reference level in a column electrode 2x is not necessarily required to be adjacent to the column electrode 2x.

FIG. 1 will be described again. At the timing of detecting the position of the finger I2, the master controller 4 first controls the integrated circuit 3a to sequentially supply finger detection signals to the row electrodes 2y in the first partial row electrode group 2yGa and then controls the integrated circuits 3a and 3b to detect the cross point capacitance changes of the first quadrant and the second quadrant every time the finger detection signal is supplied to each row electrode 2y. Next, the master controller 4 controls the integrated circuit 3b to sequentially supply the finger detection signals to the row electrodes 2y in the second partial row electrode group 2yGb and then controls the integrated circuits 3a and 3b to detect the cross point capacitance changes of the third quadrant and the fourth quadrant every time the finger detection signal is supplied to each row electrode 2y. As a result, the cross point capacitance changes of all of the intersections of the column electrodes 2x and the row electrodes 2y are obtained, and the master controller 4 thus derives the column direction position (x coordinate) and the row direction position (y coordinate) of the finger I2 from the obtained cross point capacitance changes.

Figure 4:
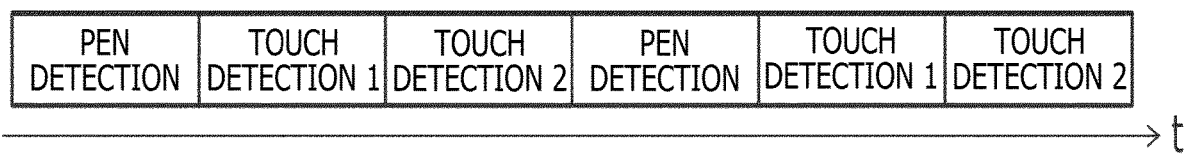
FIG. 4 is a diagram illustrating control timing of integrated circuits 3a and 3b controlled by the master controller 4.

FIG. 4 is a diagram illustrating the control timing of the integrated circuits 3a and 3b controlled by the master controller 4. As illustrated in FIG. 4, the master controller 4 is configured to repeatedly alternate between the position detection of the pen I1 (pen detection) and the position detection of the finger I2 (touch detection 1 and touch detection 2). The pen detection is as described above. touch detection 1 corresponds to the control operation for detecting the cross point capacitance changes in the first quadrant and the second quadrant as described above, and touch detection 2 corresponds to the control operation for detecting the cross point capacitance changes in the third quadrant and the fourth quadrant as described above.

The host processor 5 is configured to generate stroke data including a series of positions in chronological order, based on the positions of the pen I1 or the finger I2 detected by the master controller 4. The host processor 5 stores the generated stroke data in a storage apparatus not illustrated and executes a process of rendering the stroke data according to an instruction of the user, to display the stroke data on the display panel.

As described above, according to the pen detection system 1 of the present embodiment, the number of electrodes that need to be connected to one integrated circuit can be reduced compared to the case in which only one integrated circuit is provided. Specifically, the numbers of electrodes that need to be connected to the integrated circuits 3a and 3b can be half of all of the column electrodes 2x and half of all of the row electrodes 2y. Therefore, integrated circuits for a small panel can be used as the integrated circuits 3a and 3b, and the pen detection system 1 can be mounted on a large display panel without requiring an integrated circuit dedicated to a large display panel.

Note that although the master controller 4 controls the integrated circuits 3a and 3b in the present embodiment, the function of the master controller 4 can be provided on one of the integrated circuits 3a and 3b. In this way, the master controller 4 can be eliminated, and the pen detection system 1 can be downsized.

Next, the pen detection system 1 according to a second embodiment of the present invention will be described. The pen detection system 1 according to the present embodiment is different from the pen detection system 1 according to the first embodiment in that, of the plurality of column electrodes 2x, a predetermined number of column electrodes 2x (hereinafter, referred to as "boundary column electrodes 2x") positioned near the boundary between the first partial column electrode group 2xGa and the second partial column electrode group 2xGb are connected to both of the integrated circuits 3a and 3b. Note that although the description of the present embodiment focuses on the column electrodes 2x, the description similarly applies to the row electrodes 2y. The pen detection system 1 is similar to the pen detection system 1 according to the first embodiment in other respects. Therefore, the same reference symbols are provided to the same components, and the description blow focuses on the differences from the first embodiment.

Figure 5:
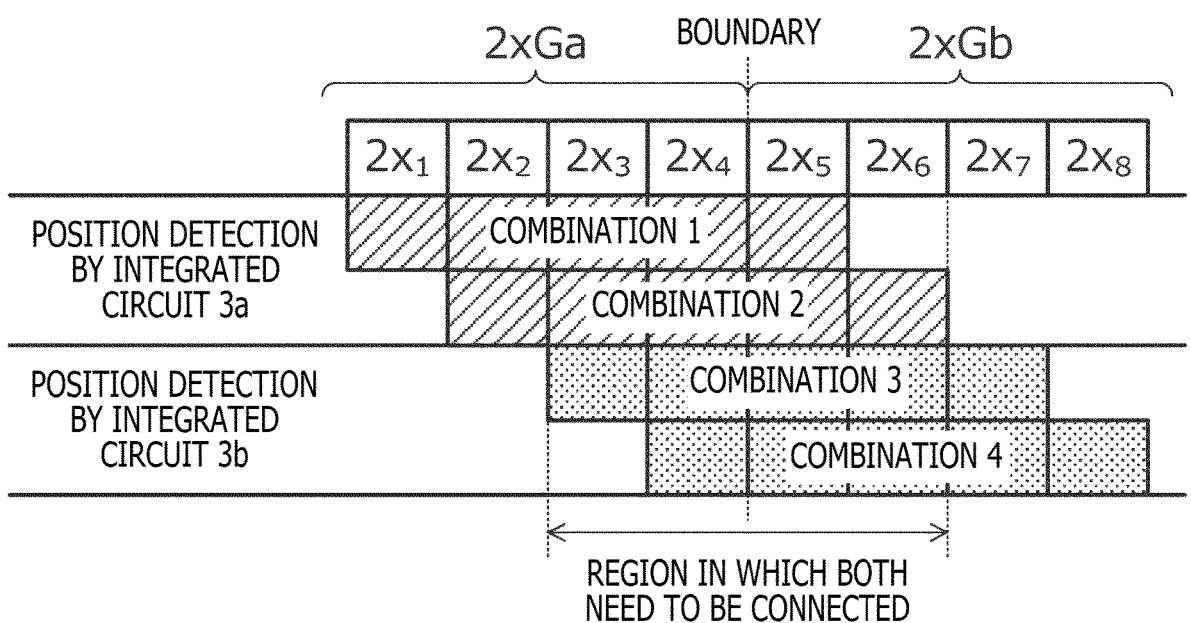
FIG. 5 is a diagram explaining the technical meaning of providing boundary column electrodes 2x.

FIG. 5 is a diagram explaining the technical meaning of providing the boundary column electrodes 2x. First, the meaning of the boundary column electrodes 2x will be described with reference to FIG. 5, and then, a specific configuration of the pen detection system 1 according to the present embodiment will be described in detail.

FIG. 5 illustrates eight column electrodes $2x_1$ to $2x_8$ positioned near the boundary of the first partial column electrode group 2xGa and the second partial column electrode group 2xGb. The master controller 4 according to the present embodiment is configured to use the methods (4-point method+2-level differential detection method) described with reference to FIG. 3, to derive the x coordinate, and therefore, the reception level in each of five adjacent column electrodes 2x is necessary to derive one x coordinate. There are four types of combinations of the five column electrodes 2x in the example of FIG. 5 including, for example, a combination of the column electrodes $2x_1$ to $2x_5$ (combination 1), a combination of the column electrodes $2x_2$ to $2x_6$ (combination 2), a combination of the column electrodes $2x_3$ to $2x_7$ (combination 3), and a combination of the column electrodes $2x_4$ to $2x_8$ (combination 4).

Here, the reception sensitivity may vary between the integrated circuit 3a and the integrated circuit 3b, and the impedance may vary between the line connected to the integrated circuit 3a and the line connected to the integrated circuit 3b. Therefore, if the reception level detected by the integrated circuit 3a and the reception level detected by the integrated circuit 3b are mixed in deriving one x coordinate, the sensitivity difference caused by the impedance difference may amplify the error in the derived x coordinate. Thus, it is desirable to use only one of the integrated circuits to detect the reception level in deriving one x coordinate.

Therefore, in considering a method of realizing the detection method, it can be understood from FIG. 5 that four boundary column electrodes 2x (column electrodes $2x_3$ to $2x_6$ in FIG. 5) can be connected to both of the integrated circuits 3a and 3b. In this way, the reception levels in the four boundary column electrodes 2x can be detected from either one of the integrated circuits 3a and 3b. Therefore, as also illustrated in FIG. 5, the x coordinate can be detected for the combinations 1 and 2 by using only the integrated circuit 3a, and the x coordinate can be detected for the combinations 3 and 4 by using only the integrated circuit 3b.

The pen detection system 1 according to the present embodiment realizes the connection method of the boundary column electrodes 2x. Hereinafter, a specific configuration of the pen detection system 1 according to the present embodiment will be described with reference to FIG. 6.

Figure 6:
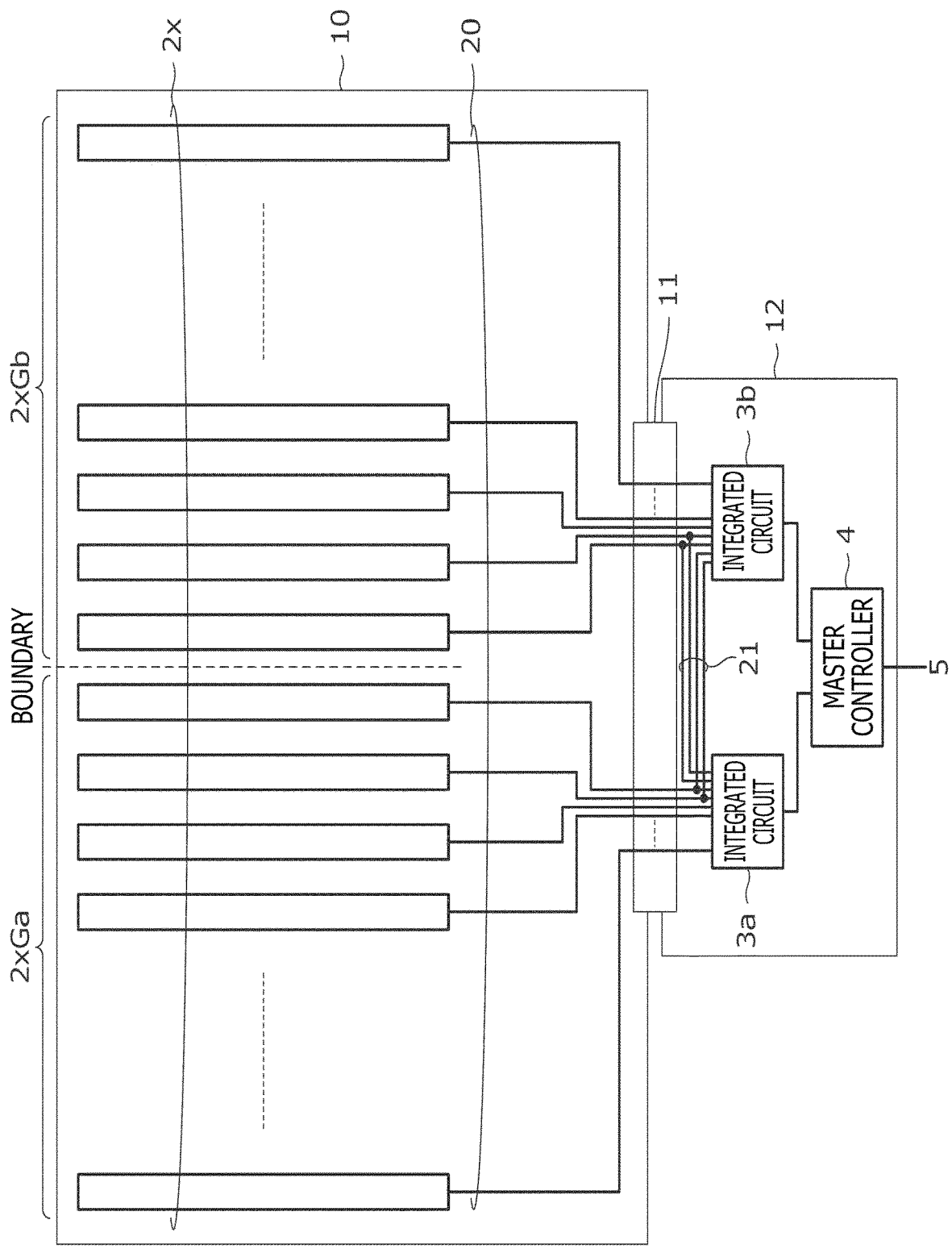
FIG. 6 is a schematic top view of the pen detection system 1 according to a second embodiment of the present invention.

FIG. 6 is a schematic top view of the pen detection system 1 according to the present embodiment. As can be understood by comparing FIG. 6 and FIG. 2, the pen detection system 1 according to the present embodiment further includes a branch line 21 added to each of the four boundary column electrodes 2x in the pen detection system 1 according to the first embodiment, wherein the branch line 21 connects the main line 20 to the other one of the integrated circuits 3a and 3b in the circuit board 12. In this way, each of the four boundary column electrodes 2x is connected to both of the integrated circuits 3a and 3b, and in deriving one x coordinate, the reception level can be detected by using only one of the integrated circuits as described above.

Here, the branch lines 21 are provided only in the circuit board 12. Although the branch lines 21 can be formed over and across the glass 10, the flexible board 11, and the circuit board 12 just like the main lines 20, the length of wiring of the branch lines 21 becomes long in that case, and the capacitance difference between the boundary column electrodes 2x and the other column electrodes 2x becomes large. In addition, an ordinary large sensor pattern can be used as the sensor pattern 2, and the number of connector terminals of the sensor pattern 2 can be reduced. By providing the branch lines 21 only in the circuit board 12, the capacitance difference between the boundary column electrodes 2x and the other column electrodes 2x can be made as small as possible.

Each of the integrated circuits 3a and 3b according to the present embodiment sets the terminal of the integrated circuit connected to the boundary column electrode 2x to high impedance when the other integrated circuit is detecting the level of the pen signal in the boundary column electrode 2x, to thereby not detect the level of the pen signal in the boundary column electrode 2x. As a result of setting the terminal to high impedance, one of the integrated circuits that is not detecting the pen signal does not add influence to the boundary column electrode 2x, and the level of the pen signal can be accurately detected.

As described above, according to the pen detection system 1 of the present embodiment, a single integrated circuit can be used to derive the x coordinate at the boundary of the first partial column electrode group 2xGa and the second partial column electrode group 2xGb when the position derivation method that needs to use a plurality of column electrodes 2x to obtain one x coordinate is adopted. This can prevent the generation of the sensitivity difference between the column electrodes 2x caused by the impedance difference between the column electrodes 2x, to thereby prevent an error in the derived x coordinate.

In addition, according to the pen detection system 1 of the present embodiment, the branch lines 21 are provided in the circuit board 12, and thus the capacitance difference between the boundary column electrodes 2x and the other column electrodes 2x can be made as small as possible. Therefore, accurate derivation of the x coordinate near the boundary is realized.

Note that although four boundary column electrodes 2x are connected to both of the integrated circuits 3a and 3b in the example described in the present embodiment, the number of boundary column electrodes 2x that need to be connected to both of the integrated circuits 3a and 3b may be determined according to the position derivation method used by the master controller 4. The number of boundary column electrodes 2x can be any number smaller than the number of column electrodes 2x included in the column electrode group 2xG, and the number of boundary column electrodes 2x does not have to be four as in the present embodiment. For example, when the 2-level differential detection method is used without using the n-point method (that is, when the reception level in each of two adjacent column electrodes 2x is necessary to derive one x coordinate), only one column electrode 2x needs to be included as the boundary column electrode 2x. In addition, when the 3-point method and the 2-level differential detection method are used (that is, when the reception level in each of four adjacent column electrodes 2x is necessary to derive one x coordinate), three column electrodes 2x can be included as the boundary column electrodes 2x. In addition, when the 6-point method and the 4-level differential detection method are used (that is, when the reception level in each of nine adjacent column electrodes 2x is necessary to derive one x coordinate), eight column electrodes 2x can be included as the boundary column electrodes 2x. In this way, the number of boundary column electrodes 2x may be one, or two or more.

Next, the pen detection system 1 according to a third embodiment of the present invention will be described. In the pen detection system 1 according to the present embodiment, equalization means is provided for reducing an input impedance difference between a wiring route (hereinafter referred to as a "first wiring route"), which connects a column electrode 2x that is not a boundary column electrode 2x to the integrated circuit 3a or the integrated circuit 3b, and a wiring route (hereinafter referred to as a "second wiring route"), which connects the boundary column electrode 2x to both of the integrated circuit 3a and the integrated circuit 3b. Such equalization means is provided on the first wiring route in the pen detection system 1 of the second embodiment. Note that, although the description of the present embodiment focuses on the column electrodes 2x, the description similarly applies to the row electrodes 2y. The pen detection system 1 is similar to the pen detection system 1 according to the second embodiment in other respects. Therefore, the same reference symbols are provided to the same components, and the description below focuses on the differences from the second embodiment.

FIG. 7 is a diagram schematically illustrating a portion of the column electrodes 2x (six electrodes counted from the boundary of the first partial column electrode group 2xGa and the second partial column electrode group 2xGb) of the first partial column electrode group 2xGa included in the pen detection system 1 according to the present embodiment. In FIG. 7, the column electrode $2x_1$ is a boundary column electrode 2x connected to both of the integrated circuits 3a and 3b, and the column electrodes $2x_2$ to $2x_6$ are column electrodes 2x connected to only the integrated circuit 3a. The column electrodes $2x_1$ to $2x_6$ are arranged in this order from the boundary of the first partial column electrode group 2xGa and the second partial column electrode group 2xGb.

As illustrated in FIG. 7, each of the integrated circuits 3a and 3b has an input impedance of, for example, approximately 10 pF at the point of connection with the main line 20 or the branch line 21. Therefore, the input impedance of the second wiring route connecting the column electrode $2x_1$ to both of the integrated circuits 3a and 3b is smaller than the input impedance of the first wiring route connecting the column electrodes $2x_2$ to $2x_6$ to only the integrated circuit 3a. The difference in the input impedance causes a sensitivity difference in the reception level of the pen signal between the column electrode $2x_1$ and the column electrodes $2x_2$ to $2x_6$, to cause deterioration in the accuracy of the detected position. Particularly, the noise removal effect expected when the differential detection method is used may be deteriorated.

Therefore, in the present embodiment, equalization means for reducing the input impedance difference between the first wiring route and the second wiring route is provided in the middle of the first wiring route corresponding to each of the column electrodes $2x_2$ to $2x_5$ as illustrated in FIG. 7. Specifically, the equalization means includes capacitors 30 (chip capacitors) respectively connected to the column electrodes $2x_2$ to $2x_5$. One end of the capacitor is grounded, and the other end is connected to the corresponding first wiring route. In addition, the capacitance of the capacitors is set to gradually decrease in order from the capacitor closest to the column electrode $2x_1$. Specifically, capacitors with 8 pF, 6 pF, 4 pF, and 2 pF are connected to the column electrodes $2x_2$ to $2x_5$, respectively.

The equalization means can be provided to reduce the input impedance difference between adjacent column electrodes 2x according to the present embodiment. Numerical values indicated in parenthesis in FIG. 7 are input impedances of the column electrodes 2x when the equalization means is provided. As indicated by the numerical values, the input impedance difference between adjacent column electrodes 2x is reduced to 2 pF in the example of FIG. 7. This can prevent the deterioration of the noise removal effect expected when the differential detection method is used, and the deterioration in the accuracy of the detected position can be suppressed.

If the equalization means (e.g., capacitors) with 10 pF is provided on the column electrodes $2x_2$ to $2x_5$ in the example of FIG. 7, the equalization means needs to be also provided on the column electrode $2x_6$ to reduce the input impedance difference between the column electrode $2x_5$ and the column electrode $2x_6$, and similarly, the equalization means needs to be provided on all of the column electrodes 2x other than the boundary column electrodes 2x. However, according to the present embodiment, the capacitance of the capacitors is set to gradually decrease in order from the capacitor closest to the column electrode $2x_1$, and therefore the input impedance difference between adjacent column electrodes 2x can be reduced without requiring the equalization means on all of the column electrodes 2x.

Note that, although the equalization means includes the capacitors in the example described in the present embodiment, the equalization means may include other means, such as additional lines connected to the first wiring route.

Although the preferred embodiments of the present invention have been described, the present invention is not limited to the embodiments in any way, and it is obvious that the present invention can be carried out in various modes without departing from the scope of the present invention.

DESCRIPTION OF REFERENCE SYMBOLS

1 Pen detection system
2 Sensor pattern
2$x$ Column electrode
2$x$G Column electrode group
2$x$Ga First partial column electrode group
2$x$Gb Second partial column electrode group
2$y$ Row electrode
2$y$G Row electrode group
2$y$Ga First partial row electrode group
2$y$Gb Second partial row electrode group
3$a$, 3$b$ Integrated circuit
4 Master controller
5 Host processor
10 Glass
11 Flexible board
12 Circuit board
20 Main line
21 Branch line
I1 Pen
I2 Finger

The invention claimed is:

1. A pen detection system that detects a pen signal transmitted from a pen to detect a position of the pen, the pen detection system comprising:
a sensor pattern in which an electrode group including first and second partial electrode groups is disposed;
a first integrated circuit that is connected to the first partial electrode group to acquire a level distribution of the pen signal in the first partial electrode group; and
a second integrated circuit that is connected to the second partial electrode group to acquire a level distribution of the pen signal in the second partial electrode group, wherein,
a predetermined number of at least 4 boundary electrodes positioned near a boundary between the first partial electrode group and the second partial electrode group among a plurality of electrodes included in the electrode group are connected to both of the first and second integrated circuits, and
one of the first or second integrated circuits sets a terminal connected to the boundary electrode to high impedance when the other of the first or second integrated circuits detects a level of the pen signal in the boundary electrode.

2. The pen detection system according to claim 1, wherein,
in response to start of supply of a finger detection signal from the first integrated circuit to the first partial electrode group, the first integrated circuit detects a capacitance change in the first partial electrode group, and the second integrated circuit detects a capacitance change in the second partial electrode group.

3. The pen detection system according to claim 2, wherein,
in response to start of supply of a finger detection signal from the second integrated circuit to the second partial electrode group, the first integrated circuit detects a capacitance change in the first partial electrode group cross, and the second integrated circuit detects a capacitance change in the second partial electrode group.

4. The pen detection system according to claim 1, wherein,
the predetermined number is a number smaller than the number of electrodes included in the electrode group.

5. The pen detection system according to claim 1, wherein,
when said other of the first or second integrated circuits detects the level of the pen signal in the boundary electrode, said one of the first or second integrated circuits does not detect the level of the pen signal in the boundary electrode.

6. The pen detection system according to claim 1, further comprising:
equalization means on a first wiring route connecting an electrode that is not the boundary electrode to the first or second integrated circuit, the equalization means reducing an input impedance difference between the first wiring route and a second wiring route connecting the boundary electrode to both of the first and second integrated circuits.

7. The pen detection system according to claim 6, wherein,
the equalization means is an additional line or a capacitor connected to the first wiring route.

8. A pen detection system that detects a pen signal transmitted from a pen to detect a position of the pen, the pen detection system comprising:
a sensor pattern in which a column electrode group including first and second partial column electrode groups and a row electrode group including first and second partial row electrode groups are placed on top of each other in a two-dimensional region;
a first integrated circuit,
that is connected to the first partial column electrode group to acquire a first column level distribution indicating a level distribution of the pen signal in the first partial column electrode group; and
that is connected to the first partial row electrode group to acquire a first row level distribution indicating a level distribution of the pen signal in the first partial row electrode group; and
a second integrated circuit,
that is connected to the second partial column electrode group to acquire a second column level distribution indicating a level distribution of the pen signal in the second partial column electrode group; and
that is connected to the second partial row electrode group to acquire a second row level distribution indicating a level distribution of the pen signal in the second partial row electrode group, wherein
the pen detection system,
derives a column direction position of the pen in the two-dimensional region, based on the first and second column level distributions; and
derives a row direction position of the pen in the two-dimensional region, based on the first and second row level distributions,
wherein,
a predetermined number of at least 4 boundary column electrodes positioned near a boundary between the first partial column electrode group and the second partial column electrode group among a plurality of column electrodes included in the column electrode group are connected to both of the first and second integrated circuits, and
one of the first or second integrated circuits sets a terminal connected to the boundary column electrode to high impedance when the other of the first or second integrated circuits detects a level of the pen signal in the boundary column electrode.

9. The pen detection system according to claim 8, wherein,
the first partial column electrode group overlaps the second partial row electrode group; and
the second partial column electrode group overlaps the first partial row electrode group.

10. The pen detection system according to claim 8, wherein,
in response to start of supply of a finger detection signal from the first integrated circuit to the first partial row electrode group, the first integrated circuit detects a cross point capacitance change of a first quadrant part where the first partial row electrode group and the first partial column electrode group cross, and the second integrated circuit detects a cross point capacitance change of a second quadrant part where the first partial row electrode group and the second partial column electrode group cross.

11. The pen detection system according to claim 10, wherein,
in response to start of supply of a finger detection signal from the second integrated circuit to the second partial row electrode group, the first integrated circuit detects a cross point capacitance change of a third quadrant part where the second partial row electrode group and the first partial column electrode group cross, and the second integrated circuit detects a cross point capacitance change of a fourth quadrant part where the second partial row electrode group and the second partial column electrode group cross.

12. The pen detection system according to claim 8, wherein,
the predetermined number is a number smaller than the number of column electrodes included in the column electrode group.

13. The pen detection system according to claim 8, wherein,
when said other of the first or second integrated circuits detects the level of the pen signal in the boundary column electrode, said one of the first or second integrated circuits does not detect the level of the pen signal in the boundary column electrode.

14. The pen detection system according to claim 8, further comprising:
equalization means on a first wiring route connecting a column electrode that is not the boundary column electrode to the first or second integrated circuit, the equalization means reducing an input impedance difference between the first wiring route and a second wiring route connecting the boundary column electrode to both of the first and second integrated circuits.

15. The pen detection system according to claim 14, wherein,
the equalization means is an additional line or a capacitor connected to the first wiring route.

* * * * *